United States Patent
Yesil et al.

(10) Patent No.: US 9,010,628 B2
(45) Date of Patent: Apr. 21, 2015

(54) SELF SERVICE TERMINAL, AN ANTI-SKIMMING UNIT, A CARD READER DEVICE, A BEZEL, A METHOD OF JAMMING AND USE OF AN ANTI-SKIMMING UNIT

(75) Inventors: Ismet Yesil, Istanbul (TR); Alp Devrim Kosal, Istanbul (TR)

(73) Assignees: Kronik Elektrik Elektronik Ve Bilgisayar Sistemleri Sanayi Ticaret Limited Sirketi (TR); TMD Holding B.V. (NL)

( * ) Notice: Subject to any disclaimer, the term of this patent is extended or adjusted under 35 U.S.C. 154(b) by 0 days.

(21) Appl. No.: 13/876,902

(22) PCT Filed: Apr. 13, 2011

(86) PCT No.: PCT/NL2011/050250
§ 371 (c)(1),
(2), (4) Date: May 14, 2013

(87) PCT Pub. No.: WO2012/060690
PCT Pub. Date: May 10, 2012

(65) Prior Publication Data
US 2013/0299586 A1  Nov. 14, 2013

(30) Foreign Application Priority Data

Oct. 1, 2010 (TR) .............................. U 2010/08030

(51) Int. Cl.
G07F 19/00 (2006.01)
G06K 7/08 (2006.01)
H04K 3/00 (2006.01)

(52) U.S. Cl.
CPC ................ G06K 7/087 (2013.01); G06K 7/084 (2013.01); G07F 19/20 (2013.01); G07F 19/2055 (2013.01); H04K 3/825 (2013.01); H04K 2203/20 (2013.01)

(58) Field of Classification Search
USPC .................. 235/449, 379; 902/4, 8–21, 30–35
See application file for complete search history.

(56) References Cited

U.S. PATENT DOCUMENTS 7,100,818 B2 * 9/2006 Swaine ......................... 235/379
7,121,460 B1 * 10/2006 Parsons et al. ................ 235/379
7,131,576 B2 * 11/2006 Utz et al. ...................... 235/379

FOREIGN PATENT DOCUMENTS

| DE | 102009019708.7 A1 | 5/2010 |
| DE | 102009003815 A1 | 10/2010 |
| EP | 06024541.2 A1 | 6/2007 |
| WO | PCT/AT2009/000241 A1 | 6/2010 |

* cited by examiner

Primary Examiner — Kristy A Haupt
(74) Attorney, Agent, or Firm — Banner & Witcoff, Ltd.

(57) ABSTRACT

The invention relates to a self service terminal, such as an Automated Teller Machine, comprising a front panel provided with a card insertion slot for inserting a magnetic card therethrough, wherein, during insertion through the insertion slot, a magnetic stripe on the card induces a card data flux into a stripe data reading zone. The terminal also comprises an anti-skimming unit for generating a jamming field so as to jam a magnetic recording unit of an illegal card reader installed near or in the card insertion slot of the front panel. The anti-skimming unit includes a first magnetic field source and at least one further magnetic field source, each source inducing a electro-magnetic field in a slot region including the card insertion slot, such that the jamming field in the stripe date reading zone deviates from the jamming field outside the stripe data reading zone.

30 Claims, 7 Drawing Sheets

SELF SERVICE TERMINAL, AN ANTI-SKIMMING UNIT, A CARD READER DEVICE, A BEZEL, A METHOD OF JAMMING AND USE OF AN ANTI-SKIMMING UNIT

RELATED APPLICATION DATA

This application is a National Stage Application under 35 U.S.C. 371 of co-pending PCT application PCT/NL2011/050250 designating the United States and filed Apr. 13, 2011; which claims the benefit of TR patent application Ser. No. 2010/08030 and filed Oct. 1, 2010 each of which are hereby incorporated by reference in their entireties.

The invention relates to a self service terminal.

As described in patent applications PCT/TR2005/000007, PCT/TR2009/000053, and TR 2010/02978 of the same applicant, when a card holder inserts a magnetic stripe card into the card entry slot of a motorized ATM, the card is taken in by means of a driver unit, and meanwhile the data present on the magnetic stripe of the card are read by the device. Once the data are read and if the card belongs to a valid user, the ATM guides the user by means of a display to enter the PIN code or make other transactions.

In order to acquire data by fraud from magnetic cards on SSTs like ATMs, a magnetic card copying device is covertly situated in front of the card entry slot of ATMs, so that the magnetic stripe card is passed through the copying device and copied accordingly, before it reaches the ATM's reader. Data-copying can similarly be performed after a user completes the transactions on an ATM, while the card is removed from the machine.

The copying device is provided with a magnetic reading head to copy the card data of a user. This magnetic reading head is placed on the region of the magnetic stripe where the card data is present to read the latter. Thus, when a card is exposed to the card reader while a transaction is made, it is passed first through the reader of the copying device and the user card data are copied. On the other hand, fake keypads or hidden cameras are also used to acquire the PIN codes of users.

Some solution proposals have been brought, including the one of the present inventors, to avoid such attempts of card copying. According to a configuration mentioned in the applications PCT/TR2005/000007, PCT/TR2009/000053, and TR 2010/02978; an electromagnetic field is generated with a transmitter coil placed in the vicinity of the entry slot of a card reader of an SST, such that the magnetic reader of any copying device placed by any third parties is effected in a disruptive manner to protect the magnetic card data.

The aforesaid solution proposals can be overcome by making use of at least two magnetic reading heads in a copying device. If two magnetic heads are provided in the copying device according to a system including the aforesaid solution proposals, and if the first of these heads is disposed to read the magnetic stripe of a card, and the second one is placed not to read any magnetic stripe data, but as close as possible to the first one, corrupted card data will be generated on the first head due to the jamming signal effect, whereas only the jamming signal shall be generated on the second head since no card data is read here. Thus, uncorrupted card data shall be acquired by processing these two signals electrically (i.e. filtering or adding the two signals in reversed phases).

One object of the present invention is to generate a jamming electromagnetic field in the vicinity of the card entry slot in ATM-like SSTs to prevent a magnetic card against copying, and to counteract that jamming electromagnetic fields are easily filtered from a card data field based on recordings made by an extra magnetic reading head of an illegally installed reading unit.

In order to achieve this object, the present invention provides a self service terminal according to claim 1. By providing a jamming field in a stripe data reading zone that deviates from a jamming field outside the stripe data reading zone, an additional field recording outside the stripe data reading zone will not help filtering a local jamming field from a card data field. Then, fraud on self service terminals is counteracted since it becomes difficult or even impossible to read card data by recording units that are placed illegally on front panels of self service terminals, around the card entry slots.

Preferably, the jamming field generated by means of the device according to the present invention is made different at different positions of the card entry slot, so that a different signal is generated on at least one other magnetic reading head used, and such that the signal composed of the total of card data and jamming signal is prevented against filtering by the signal generated by means of said at least one other magnetic reading head.

The invention also relates to an anti-skimming device.

Further, the invention relates to a card reader device.

In addition, the invention relates to a bezel.

Further, the invention relates to a method of jamming an illegal card reader.

Besides, the invention relates to a use of an anti-skimming device.

Further advantageous embodiments according to the invention are described in the following claims.

By way of example only, embodiments of the present invention will now be described with reference to the accompanying figures in which.

It is noted that the figures show merely preferred embodiments according to the invention. In the figures, the same reference numbers refer to equal or corresponding parts.

Figure 1:
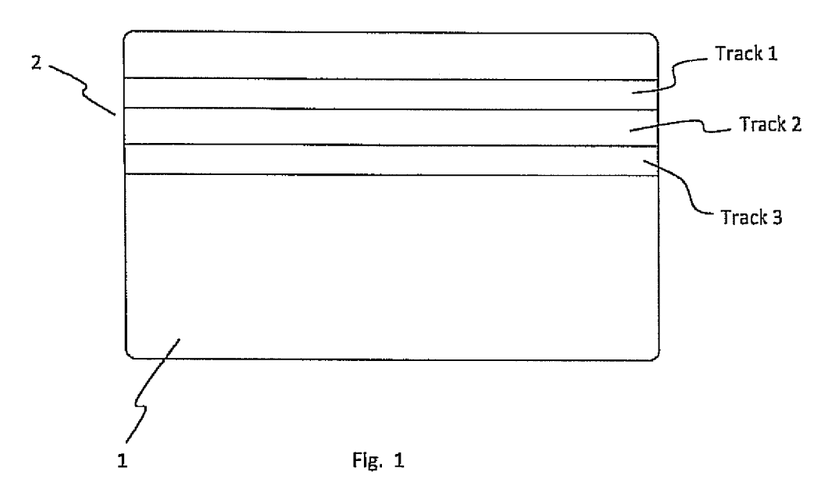
FIG. 1 shows a schematic view of a magnetic stripe card.
Figure 2:
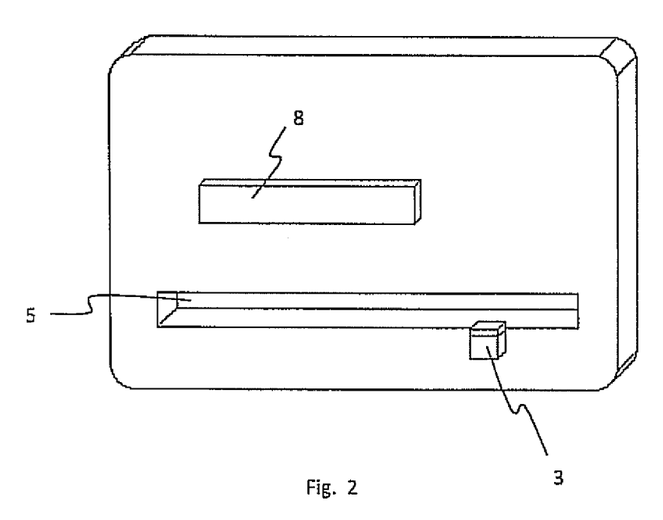
FIG. 2 shows a schematic view of a copying device having a single head.

FIG. 1 shows a schematic view of a magnetic stripe card. In order to copy the magnetic card data, the reading head to read the card data must correspond to a track 2 region on the magnetic stripe of the card 1. This is because the card information of a user is present on this region of the magnetic stripe 2. By placing the reading head of the copying device onto the track 2 region, the magnetic stripe 2 will also pass over the magnetic reader 3 of the copying device while a card 1 is inserted or removed so that the card information are copied. Therefore, the horizontal position of the device to read the card 1 data must be kept constant. The copying device may not have a fixed position at the vertical direction.

There are systems available, proposing the prevention of any card 1 against copying, by generating a jamming electromagnetic signal around the card entry slot 5 to prevent such data against copying by means of an arrangement as referred to above. Such generated signals effect the magnetic card reader, so that, besides the card data, a jamming signal is generated on the magnetic reader as well, and the reader is prevented from acquiring the data.

Figure 3:
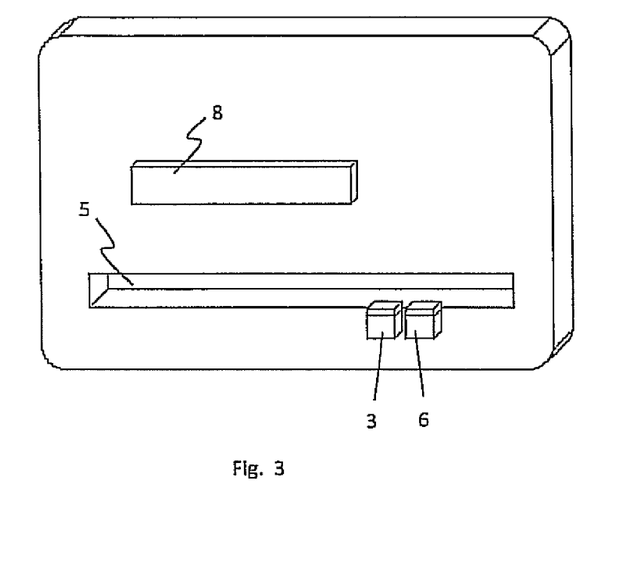
FIG. 3 shows a schematic view of a copying device having two heads.

When, for instance, two magnetic heads are provided in the copying device, and if the first of said heads 3 is positioned to read the track 2 region of the card's magnetic stripe, and if the second head 6 is placed so as not to read any magnetic stripe 2 data at a close distance to the first one (possibly at the exterior of the magnetic stripe), corrupted card data due to the jamming signal effect (i.e. jamming signal+card data) will be generated on the first head 2, whereas only the jamming signal will be generated on the second head 6 since no card data has been read. A clean card data can be obtained by electrically processing these two signals (only the jamming signal, jamming signal and card data). The process of obtaining clean card data can be performed, for instance, by coupling the reading heads 3, 6 to a preamplifier at parallel reverse phases, or recording these two signals and then filtering the signal from the first head 3 with respect to the signal of the second head 6 composed only of the jamming signal.

As described above, since the horizontal place of the first reading head 3 must be kept constant, generating a jamming field different in this region than those of other regions shall preclude any filtering attempt. For this reason, generating different fields on two heads 3, 6 shall increase the total jamming signal effect in a system in which a total of two heads 3, 6 are physically coupled. This is because, since different signals shall be generated on two heads, they shall be generated, in a sense, in the form of an addition of both signals, instead of the two signals electrically canceling each other.

Making different the jamming electromagnetic fields generated on magnetic reading heads 3, 6 is such a form of signal, in which the jamming signal effect cannot be canceled even after processing the jamming signal generated in one of the heads 3, 6 and the fields generated on one other head or heads disposed for filtering purposes. For instance, generating an identical signal on each head 3, 6 shall mean that the signal can directly be filtered. There may be generated differences between the signal on one head and the signals on the other heads in the form of phase difference, level difference, difference in the form of signal, intensity difference, frequency difference within the efficient signal frequency limits (0 Hz-5 Khz), generating signal in the track 2 region only, and any combinations of these differences.

The regions in which an electromagnetic field is intense that is generated by passing a current through a coil varies depending on the form of coil and on the distance to the coil (inversely proportional to the square of distance). Likewise, the amount of current passed through the coil will change the electromagnetic field strength generated by the coil. The form of a signal generated by a coil under the control of a driver circuit can be varied (the details of a driver stage of a control circuit required for an efficient jamming signal can be found in TR 2010/02978). A signal that is different on the track 2 region than those on other regions can be generated by making use of these features in the transmitter coil.

For this purpose, a means that may be composed of at least one transmitter coil or ferromagnetic materials with high magnetic permeability, such as a permanent magnet or mu-metal, is placed at various positions in the vicinity of a card entry slot, so that an electromagnetic field generated by the coil 8 is focused to a certain point (the track 2 region) and the direction of electromagnetic field lines are deflected, such that different fields are obtained on the track 2 region and on other regions. The ferromagnetic material used to deflect the field may be movable or immovable. A permanent magnet or a ferromagnetic material can destruct the normal pattern of a jamming field propagated by the transmitter coil; put differently, the field can be diverted in a sense. Considering this diverting effect, the track 2 region of the field is made different from other regions. When the ferromagnetic materials used are movable, an transiently-changeable field can be obtained. The device 7 can also comprise a combination of at least one transmitter coil and at least one ferromagnetic material.

The drive of ferromagnetic materials can be provided by a small motor, or a pneumatic, hydraulic, or similar actuator, by moving these materials in a linear or arc-like guide. The extra transmitter coil may similarly be rendered movable.

The transmitter coil 7 can be configured in a form of loop, of a elongate member, or in any other form determined according to its function.

A field that can be changed in a controlled manner is obtained at the track 2 region, as a result of positioning the areas of electro-magnetic fields in which the electro-magnetic fields is intense, which are generated by at least two transmitter coils (7, 8), preferably of different physical structures, and actuated by common or separate actuators (drivers), at points different from each other (at different x,y,z), preferably so as to effect the track 2 region at different levels. Thus, since the position of the second head 6 (or of 2nd and 3rd heads) placed for filtering purposes and the physical position of the first reading head are different, the first 8 and other coils 7 will effect these heads 3, 6 at different levels.

The fact that the transmitter coils 7, 8 have different physical structures causes the fields propagated by each transmitter to be different with respect to the form of propagation. Concerning a bar-like coil, for instance, the strong areas are generated at the end points of the bar, whereas in a loop-like coil they will be generated in the interior region of the coil. Since it is desired to have the field propagate in a non-uniform manner according to the present invention, different physical structures are preferred.

Figure 4:
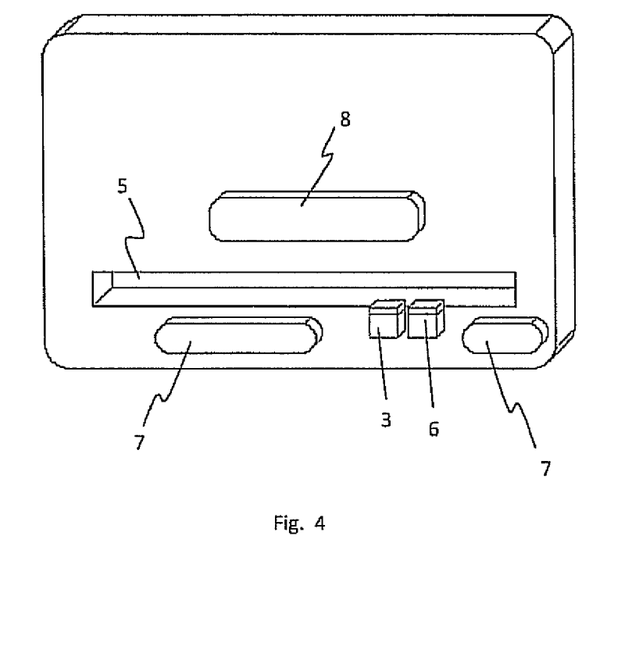
FIG. 4 shows a schematic view of the copying device of FIG. 3 and an anti-skimming unit according to a first embodiment of the invention.

With respect to the positioning of transmitter coils 7, 8, a configuration provided with a two-head 3, 6 copier and three transmitter coils is preferred, as illustrated in FIG. 4. In other words, the first transmitter coil may be placed very close to the first reading head 3, whereas the second transmitter coil may be kept slightly away on a different angle, and similarly the third transmitter coil may be positioned farther away. The advantage of this configuration is that the effect levels of these transmitter coils become different with respect to the first and second heads, when the second reading head 6 is placed to a different place, thereby the case of generating different signals on the heads for filtering purposes is avoided.

Driving unit/units drive(s) the coils 7, 8 so as to have them generate signals with different features. With respect to the drivers, it has to be taken into account at the driver stage that the jamming signals, which are generated taking account of the interference feature of the electromagnetic waves, do not yield an effect of cancellation onto each other. This means, the signal is random, but it has not to be a controlled virtual randomness. Thus, the signals generated on the heads are made different by generating a field with efficient jamming signal feature from all coils 7, 8. This is because each head 3, 6 is influenced by a different level of signal from each coil 7, 8, and since each coil propagates signals with different features, the jamming field yielded in the track 2 region and the field on other regions are made different. Filtering the combination of a jamming signal and card data on the first reader 3 with (from) a signal received from the other heads 6 is thus avoided.

As known, the position of the first reading head 3) in the copying device is kept constant on the horizontal plane. Accordingly, in order to suppress the filtering capability of the second reading head 6 used for filtering purposes at any different positions (on a different (x,y,z) with respect to the first head), preferably three differently-sized and -formed transmitter coils are situated so as to affect the track 2 region from the left, from the right, and from above at different levels. Thus, different fields are generated for any probable three-dimensional positions of the second head.

The position of the second head 6 employed in a copying device is not of high importance for a system composed of one transmitter coil only. Placing the second head 6 as possible as close to the first head 3 shall allow both heads 3, 6 to receive a similar signal and to make filtration.

In a system comprising more than one transmitter coil, as it is the case of the present invention, the position of the second head 6 for filtering purposes bears great importance. A person producing the copying device shall attempt to detect the probable position of the second head so that both heads can receive the most similar signals possible in various manners (by making measurements on the ATM). In order to avoid such a configuration, the transmitter coils 7, 8 may be run in each case in different combinations, e.g. for a first client in a system with three transmitter coils, the first two coils can be driven as the card is inserted while the third one is kept immovable, whereas the immovable coil can now be driven as the card is removed while the other two coils are kept immovable. Such differences can be increased, e.g. in the form of changing the driving duration of coils, changing the form of signals, changing the power of signals, etc. These differences can also be arranged so as to be different for each client. Thus, a person making adjustments to make a copying device can be prevented from detecting the most similar position possible.

Copying devices are designed typically by persons with high technical abilities and are produced in mass quantity and sold accordingly. Considering this fact, keeping the positions of the transmitter coils slightly different for any SST shall avoid the operation of copying devices produced in mass quantities.

Figure 5:
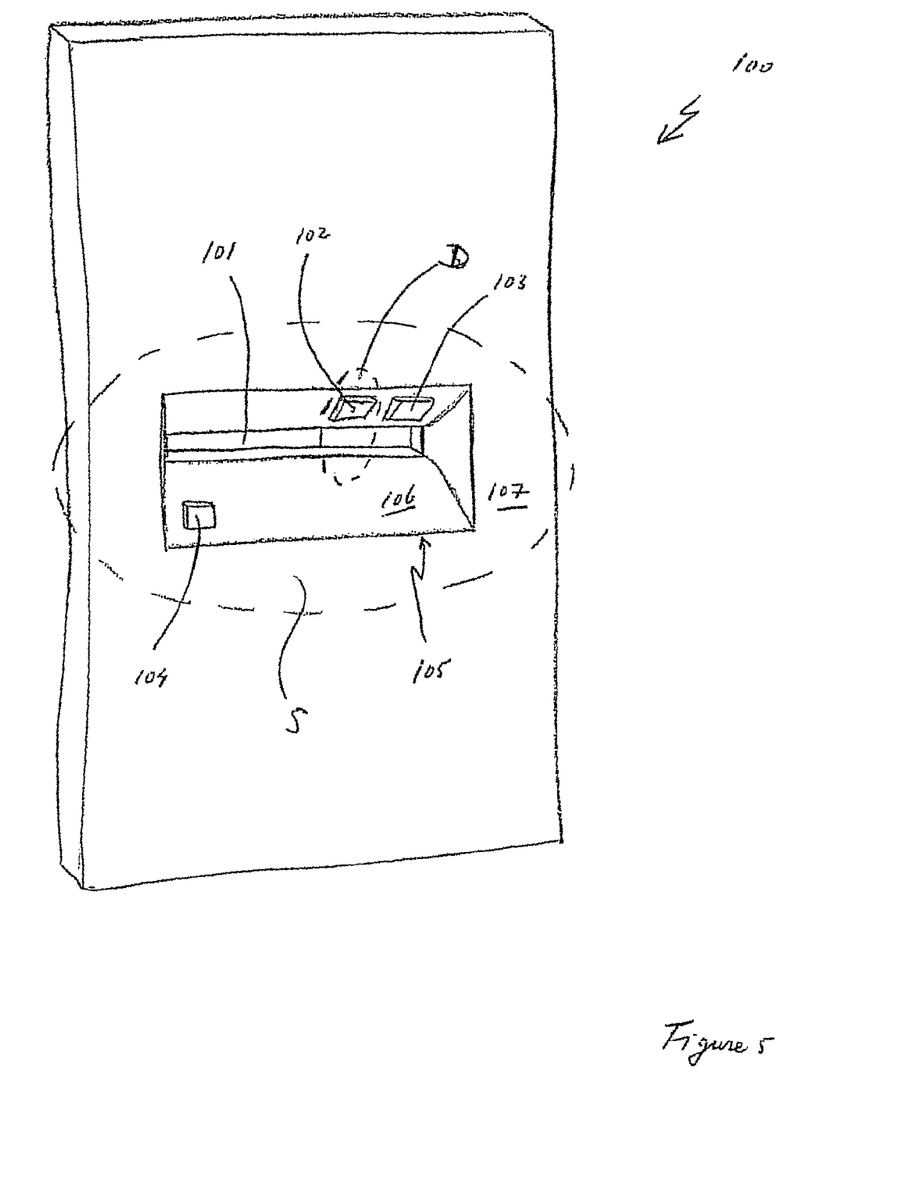
FIG. 5 shows a schematic perspective backside view of a self service terminal front panel provided with an anti-skimming unit according to a second embodiment of the invention.

FIG. 5 shows a schematic perspective backside view of a self service terminal front panel provided with an anti-skimming unit according to a second embodiment of the invention. A self service terminal is an electronic terminal capable of processing magnetic cards that are provided by clients, so as to offer automated services. An example of such a self service terminal is an Automated Teller Machine. However, also other types of self service terminals exist, such as a payment device.

Self service terminals are provided with a front panel directed to clients. The front panel is provided with a card insertion slot 101 for inserting a magnetic card therethrough. The front panel may further include an electronic user interface, such as a key board and/or a display. In FIG. 5 the back side of a self service terminal front panel is shown.

When a magnetic card is inserted through the slot 101, a magnetic stripe on the card induces a card data flux into a stripe data reading zone D. The card data field is read by a reader unit arranged in the self service terminal, but can also be recorded by a magnetic recording unit of an illegal card reader installed near or in the card insertion slot of the front panel. Thereto, the terminal also comprising an anti-skimming unit for generating a jamming field so as to jam the illegal magnetic recording unit.

The anti-skimming unit includes a first magnetic field source 102 and at least one further magnetic field source, viz. a second magnetic field source 103 and a third magnetic field source 104. Each magnetic field source 102-104 induces a electro-magnetic field in a slot region S including the card insertion slot 101, such that the jamming field in the stripe date reading zone D deviates from the jamming field outside the stripe data reading zone D. The electro-magnetic fields induced by the magnetic field sources form the jamming field. Preferably, the jamming field has a spectrum between 0 Hz and circa 5 kHz, preferably between circa circa 1.5 kHz and circa 3 kHz to make it difficult to distinguish it from a card data field that has similar spectral components.

Preferably, the electro-magnetic field induced by the first magnetic field source vanishes in the stripe data reading zone D while the field of the at least one further magnetic field source 103, 104 radiates into the stripe data reading zone D. Then, the first magnetic field source disturbs a reference reading head of the illegal card reader, while the at least one further magnetic field source independently disturbs the reader of the illegal card reader that also records the card data field.

Though the present embodiment of FIG. 5 shows three magnetic fields sources, the anti-skimming unit according to the invention may include another multiple number of magnetic field sources, e.g. two magnetic field sources or four magnetic field sources.

In order to drive the magnetic field sources, the self service terminal can be provided with at least one driver circuit driving the first and the at least one further magnetic field source. In principle, at least one static magnetic field source can be applied, that is not driven by a driver circuit.

Optionally, the anti-skimming unit includes a magnetic shield shielding the stripe data reading zone from the first magnetic field, so that the field induced by the first magnetic field source does not penetrate the stripe data reading zone. The words "magnetic shield" should be understood as an element directing away or vanishing magnetic fields in the stripe data reading zone. The stripe data reading zone may include a zone facing away from a card surface provided with the magnetic stripe In order to improve the effectiveness of preventing skimming, the self service terminal may comprise an actuator on which a magnetic field source is mounted, for modifying the position and/or orientation of the mounted magnetic field source. Since the position and/or orientation of the source is not stable over time, it is more complicated to appropriately filter skimming data.

Alternatively, or additionally, the skimming device can be disturbed by changing the jamming field, e.g. by driving the magnetic field sources only if a magnetic card is present in the card insertion slot and/or on the card moving path, or by driving only a subset of pre-selected magnetic field sources if a magnetic card is present in the card insertion slot and/or on the card moving path. In the latter case, the constitution of the pre-selected magnetic field sources in the subset may vary over time. Further, the electro-magnetic field induced by a magnetic field source can vary over time, preferably in amplitude and/or frequency.

In the shown embodiment, all magnetic field sources are mounted to the front panel, to generate a disturbing field disturbing a reading unit of a skimming device that is normally also mounted to the front panel. More general, at least one magnetic field source can be mounted to the front panel. In the shown embodiment, the front panel 100 comprises a bezel 105 surrounding the card insertion slot 101, wherein at least one of the magnetic field sources is mounted to a beveled surface 106 of the bezel 105. Alternatively, at least one magnetic field source is mounted to a flat surface 107 of the panel 100, or at least one magnetic field source can be positioned on another supporting structure, e.g. an additional frame or a card reader.

Generally, the self service terminal further comprises a card reader device (not shown) arranged near the card insertion slot 101 and aligned therewith for receiving and reading an inserted magnetic card. The card reader device usually comprises a mechanism moving a magnetic card from the slot 101 along a card moving path towards a card reading position, and a magnetic recording head for recording the card data field. In order to obtain effective protection, the stripe data reading zone substantially includes the lateral position of the magnetic recording head relative to the card moving path.

Preferably, the at least one driving circuit includes a serial resonance circuit providing superior disturbing fields. Further, the at least one driving circuit may include a H-bridge, the intermediate section being provided with resonance elements and the free end sections being provided with switches, as described in more detail in view of FIGS. 7 and 8. It appears that application of such a H-bridge avoids undesired fading effects.

Figure 6:
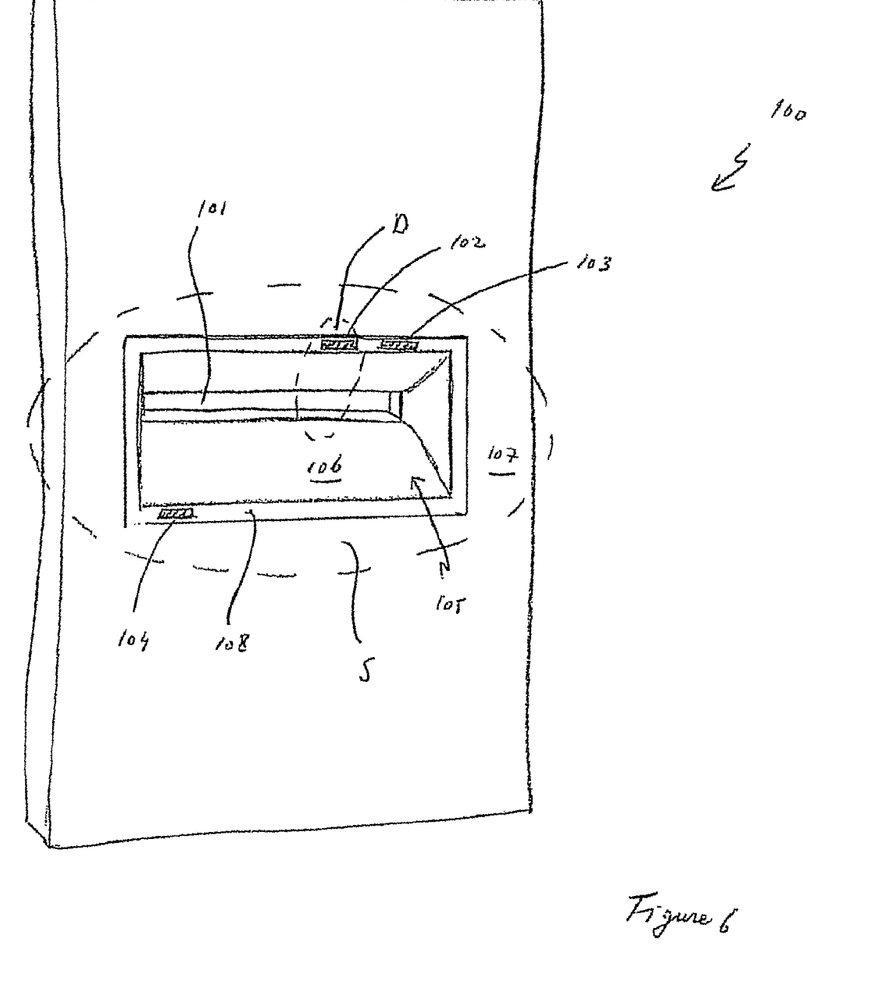
FIG. 6 shows a schematic perspective backside view of a self service terminal front panel provided with an anti-skimming unit according to a third embodiment of the invention.

FIG. 6 shows a schematic perspective backside view of a self service terminal front panel provided with an anti-skimming unit according to a third embodiment of the invention. Here, the magnetic field sources of the anti-skimming device are mounted in a ring-shaped structure 108 of the bezel, the ring-shaped structure surrounding the card insertion slot. In the shown embodiment, the magnetic field sources are arranged at the back side of the front panel. In principle, however, the magnetic field sources can be arranged at another position, e.g. more to the front of the front panel, or at another circumferential position, such that the jamming field in the stripe date reading zone D deviates from the jamming field outside the stripe data reading zone D.

Figure 7:
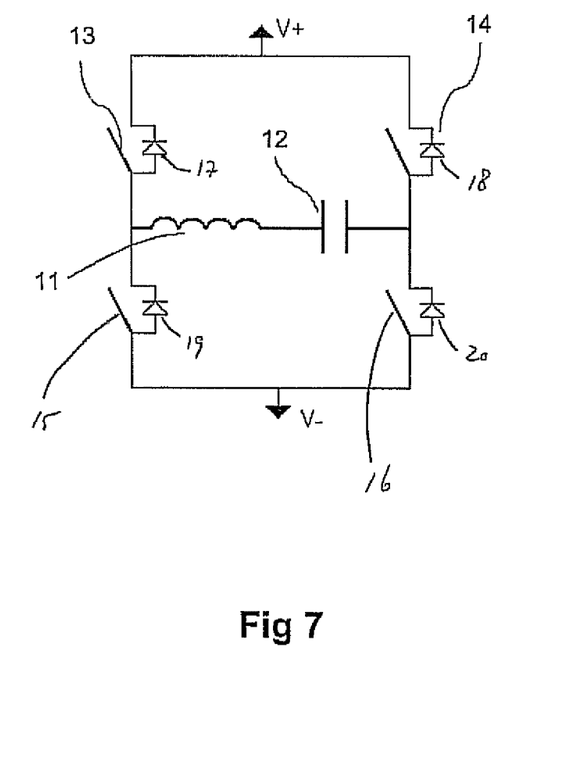
FIG. 7 shows a schematic diagram of a first driver circuit.

FIG. 7 shows a schematic diagram of a first driver circuit. The circuit includes a sub-circuit comprising an inductor 11 and a capacitor 12 arranged in series for generating a resonance driving signal for driving the magnetic field sources of the anti-skimming unit. The circuit further includes two switch branches, each branch including a pair of switches 13, 15; 14, 16 arranged in series. The branches further include diodes, each diode 17, 19, 18, 20 being arranged in parallel with a corresponding switch 13, 15, 14, 16. The ends of the sub-circuit are connected to corresponding switch branches, between the switches, thus forming a H-bridge. The ends of the switch branches are connected to a high voltage terminal V+ and a low voltage terminal V−, respectively. By applying a H-bridge undesired fading effects are counteracted.

Figure 8:
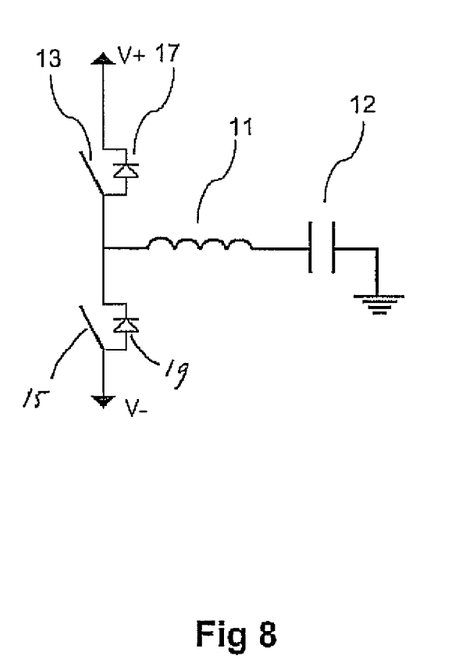
FIG. 8 shows a schematic diagram of a second driver circuit.

FIG. 8 shows a schematic diagram of a second driver circuit. Here, also the driver circuit includes a sub-circuit comprising an inductor 11 and a capacitor 12, arranged in series. Further, the circuit includes a single switch branch having ends being connected to a high voltage terminal V+ and a low voltage terminal V−, respectively. The switch branch is similar to the switch branches of the driver circuit shown in FIG. 7, including a pair of switches 13, 15 arranged in series and diodes 17, 19 in parallel to the switches. A first end of the sub-circuit is connected to the switch branch, between the switches 13, 15. A second end of the sub-circuit is connected to ground. The driver circuit shown in FIG. 8 forms a so-called symmetrically driven circuit.

Figure 9:
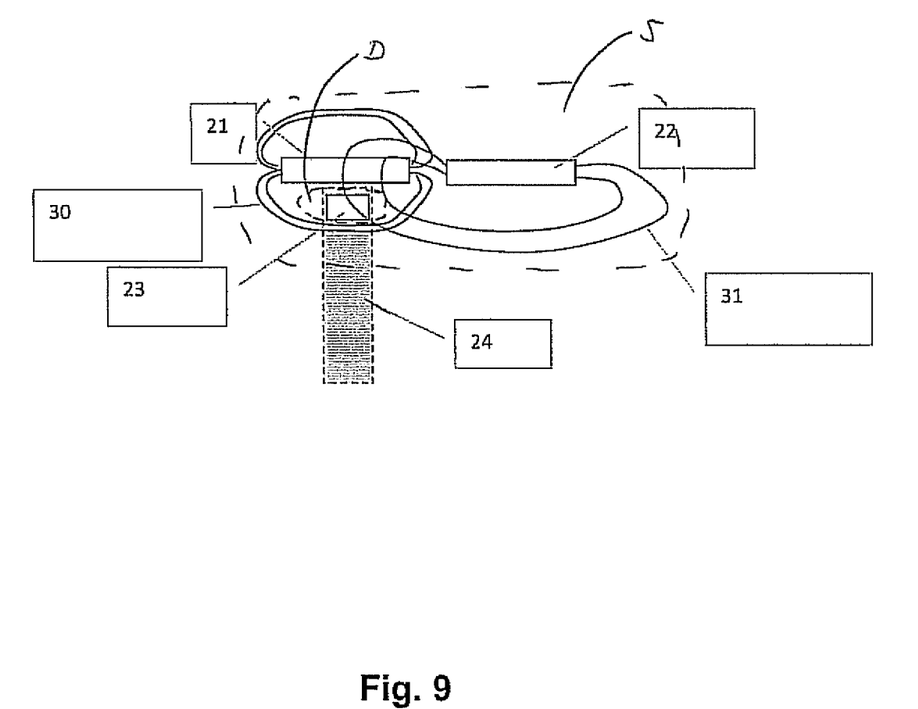
FIG. 9 shows a schematic view of an anti-skimming unit according to the invention.

FIG. 9 shows a schematic view of an anti-skimming unit according to the invention. In the shown embodiment, the anti-skimming unit includes a first magnetic field source 21 and a second magnetic field source 22 arranged next to each other. A slot region S is defined including the card insertion slot 101 of the self service terminal. In FIG. 9, also a data recording head 23 of an illegal skimming device is shown. The data recording head 23 is positioned in a stripe data reading zone D such that upon inserting a magnetic card through the insertion slot 101, a static magnetic flux can be recorded. Thereto, the recording head of the skimming device can be placed in the stripe data reading zone D, near a second stripe 24, also called second track.

The magnetic card includes at least one stripe along which the magnetic material has been provided with areas of alternating magnetic orientation to represent digital information. The areas of alternating magnetic orientation are typically either one ore two unitary lengths, and are oriented such that at the location of abutment, the adjacent areas have the same polarity. At these abutting locations, there is a high concentration of magnetic flux. For financial transaction cards, the magnetic stripe includes usually three parallel tracks of which the data are represented in accordance with the IATA, ABA and Thrift formats.

When the magnetic stripe is inserted through the insertion slot, these abutting locations with a high concentration of magnetic flux induce a peak signal in the recording head of the skimming device. In the inserting process, the illegal data recording head is close to or in physical contact with the stripe on the magnetic card.

A skimming device of the so-called stereo type also includes a reference recording head for measuring a jamming field that is generated by an anti-skimming unit. Using measurements of the reference head, recordings of the data recording head of the skimming device can in principle be compensated for the jamming field for retrieval of illegally obtained card data.

In order to disturb a stereo skimming device, the first and second magnetic field sources of the anti-skimming unit according to the invention generate a jamming field in a specific manner, such that the jamming field in the stripe date reading zone D deviates from the jamming field outside the stripe data reading zone D.

According to an aspect of the invention, the first electro-magnetic field source 21 induces a first electro-magnetic field 30 that vanishes in the stripe data zone D. The data recording head 23 of the stereo skimming device is located in a dead region where the first electro-magnetic field 30 is zero or approximately zero. Further, the second magnetic field source 22 induces a second electro-magnetic field 31 that radiates into the stripe data reading zone D.

By applying the first electro-magnetic field 30, a reference recording head of the stereo skimming device records a jamming field that is not present in the stripe data zone D. Therefore, a reference recording performed by the stereo skimming device does not provide meaningful information for filtering a noisy data signal that is recorded by the data recording head 23.

By applying the second electro-magnetic field 31, a jamming field is generated that is at least present in the stripe data reading zone D to add noise to the magnetic flux of the magnetic stripe. By adding noise, it is counteracted that the data recording head 23 of the skimming device records clear data signals. Since the reference recording head is jammed by the first electro-magnetic field 30, a reference recording does not contribute in appropriately filtering a data signal that is recorded by the data recording head 23 of the skimming device. In an advantageous manner, not merely a single head skimming device, but also a stereo skimming device can be jammed successfully by the anti-skimming device according to the invention. According to a further aspect of the invention, even more magnetic field sources can be applied for generating disturbing electro-magnetic fields, e.g. a third magnetic field source.

The invention is not restricted to the embodiments described herein. It will be understood that many variants are possible.

The principle of applying the jamming field can not only be applied to a self service terminal having an integrated anti-skimming device, but also to existing self service terminals, e.g. by installing an anti-skimming unit according to the invention.

These and other embodiments will be apparent for the person skilled in the art and are considered to fall within the scope of the invention as defined in the following claims.

The invention claimed is:

1. A self service terminal, such as an Automated Teller Machine, comprising a front panel provided with a card insertion slot for inserting a magnetic card therethrough, wherein, during insertion through the insertion slot, a magnetic stripe on the card induces a card data flux into a stripe data reading zone (D), the terminal also comprising an anti-skimming unit for generating a jamming field so as to jam a magnetic recording unit of an illegal card reader installed near or in the card insertion slot of the front panel, wherein the anti-skimming unit includes a first magnetic field source and at least one further magnetic field source, each source inducing an electro-magnetic field in a slot region (S) including the card insertion slot, such that the jamming field in the stripe date reading zone (D) deviates from the jamming field outside the stripe data reading zone (D).

2. The self service terminal according to claim 1, wherein the electro-magnetic field induced by the first magnetic field source vanishes in the stripe data reading zone (D) and wherein the at least one further field source radiates into the stripe data reading zone (D).

3. The self service terminal according to claim 1, wherein the anti-skimming unit includes three magnetic field sources.

4. The self service terminal according to claim 1, wherein the anti-skimming unit comprises at least one driver circuit driving the first and the at least one further magnetic field source.

5. The self service terminal according to claim 1, wherein the anti-skimming unit includes a magnetic shield shielding the stripe data reading zone from the first electro-magnetic field.

6. The self service terminal according to claim 1, further comprising an actuator on which a magnetic field source is mounted, for modifying the position and/or orientation of the mounted magnetic field source.

7. The self service terminal according to claim 1, wherein a multiple number of magnetic field sources are driven only if a magnetic card is present in the card insertion slot and/or on the card moving path.

8. The self service terminal according to claim 1, wherein only a subset of pre-selected magnetic field sources is driven if a magnetic card is present in the card insertion slot and/or on the card moving path.

9. The self service terminal according to claim 8, wherein the constitution of the pre-selected magnetic field sources in the subset varies over time.

10. The self service terminal according to claim 1, wherein the electro-magnetic field induced by a magnetic field source varies over time in amplitude and/or frequency.

11. The self service terminal according to claim 1, wherein at least one of the magnetic field sources is mounted to the front panel.

12. The self service terminal according to claim 1, further comprising a bezel surrounding the card insertion slot, wherein at least one of the magnetic field sources is mounted to the bezel.

13. The self service terminal according to claim 12, wherein the bezel comprises a ring-shaped structure surrounding the card insertion slot, at the back side of the front panel.

14. The self service terminal according to claim 1, further comprising a card reader device arranged near the card insertion slot and aligned therewith for receiving and reading an inserted magnetic card.

15. The self service terminal according to claim 1, further comprising a display for reading card information retrieved from an inserted magnetic card.

16. The self service terminal according to claim 1, wherein the stripe data reading zone includes a zone facing away from a card surface provided with the magnetic stripe.

17. The self service terminal according to claim 1, wherein the card reader device comprises a mechanism moving a magnetic card from the slot along a card moving path towards a card reading position, and a magnetic recording head for recording the card data field.

18. The self service terminal according to claim 1, wherein the stripe data reading zone substantially includes the lateral position of the magnetic recording head relative to the card moving path.

19. The self service terminal according to claim 1, wherein the jamming field is formed by the electro-magnetic field induced by the magnetic field sources.

20. The self service terminal according to claim 1, wherein the jamming field has a spectrum between circa 0 Hz and circa 3 kHz.

21. The self service terminal according to claim 1, wherein the at least one driving circuit includes a serial resonance circuit.

22. The self service terminal according to claim 1, wherein the at least one driving circuit includes a H-bridge, the intermediate section being provided with resonance elements and the free end sections being provided with switches.

23. An anti-skimming unit generating a jamming field so as to jam a magnetic recording unit of an illegal card reader installed near or in a card insertion slot provided on a front panel comprised by a self service terminal, wherein, during insertion of a magnetic card through the insertion slot, a magnetic stripe on the card induces a card data flux into a stripe data reading zone (D), wherein the anti-skimming unit includes a first magnetic field source and at least one further magnetic field source, each source inducing an electro-magnetic field in a slot region (S) including the card insertion slot, such that the jamming field in the stripe date reading zone (D) deviates from the jamming field outside the stripe data reading zone (D).

24. A card reader device for reading a magnetic card, the card reader device comprising an anti-skimming unit comprising a magnetic recording head for recording the card data field radiated by a magnetic stripe on a magnetic card received by the device, further comprising an anti-skimming unit generating a jamming field so as to jam a magnetic recording unit of an illegal card reader installed near or in a card insertion slot provided on a front panel comprised by a self service terminal, wherein, during insertion of a magnetic card through the insertion slot, the magnetic stripe on the card induces a card data flux into a stripe data reading zone (D), wherein the anti-skimming unit includes a first magnetic field source and at least one further magnetic field source, each source inducing an electro-magnetic field in a slot region (S) including the card insertion slot, such that the jamming field in the stripe date reading zone (D) deviates from the jamming field outside the stripe data reading zone (D).

25. A bezel attachable to a front panel of a self service terminal, for surrounding a card insertion slot provided on the front panel, wherein, during insertion of a magnetic card through the insertion slot, the magnetic stripe on the card induces a card data flux into a stripe data reading zone (D), the bezel comprising an anti-skimming unit for generating a jamming field so as to jam a magnetic recording unit of an illegal card reader installed near or in the card insertion slot of the front panel, wherein the anti-skimming unit includes a first magnetic field source and at least one further magnetic field source, each source inducing an electro-magnetic field in a slot region (S) including the card insertion slot, such that the jamming field in the stripe data reading zone (D) deviates from the jamming field outside the stripe data reading zone (D).

26. A method of jamming an illegal card reader installed near or in a card insertion slot provided on a front panel comprised by a self service terminal, wherein, during insertion of a magnetic card through the insertion slot, a magnetic stripe on the card induces a card data flux into a stripe data reading zone (D), wherein the method includes a step of inducing an electro-magnetic field in a slot region (S) including the card insertion slot, such that a resulting jamming field in the stripe data reading zone (D) deviates from the induced jamming field outside the stripe data reading zone (D).

27. The method according to claim 26, including a step of dynamically varying the electro-magnetic field induced by an electro-magnetic field source, preferably in amplitude and/or frequency.

28. The method according to claim 26, further including dynamically activating and deactivating a single or a multiple number of magnetic field sources.

29. Use of A method of using an anti-skimming unit, wherein the anti-skimming unit includes a first magnetic field source and at least one further magnetic field source, each source inducing an electro-magnetic field in a slot region (S) including a card insertion slot provided on a front panel comprised by a self service terminal, wherein, during insertion of a magnetic card through the insertion slot, a magnetic stripe on the card induces a card data flux into a stripe data reading zone (D), comprising the anti-skimming unit generating a jamming field so as to jam a magnetic recording unit of an illegal card reader installed near or in the card insertion slot of the front panel, such that the jamming field in the stripe data reading zone (D) deviates from the jamming field outside the stripe data reading zone (D).

30. The method of claim 29, further including mounting the anti-skimming unit to a front panel provided with a card insertion slot of a self service terminal.

* * * * *